United States Patent
Jian et al.

(10) Patent No.: US 8,049,863 B2
(45) Date of Patent: Nov. 1, 2011

(54) METHOD FOR MANUFACTURING LIQUID CRYSTAL DISPLAY PANEL

(75) Inventors: Jia-Hau Jian, Hsin-Chu (TW); Chih-Ho Chiu, Hsin-Chu (TW); Cheng-Jung Chiang, Hsin-Chu (TW); Chung-Ching Hsieh, Hsin-Chu (TW); Te-Sheng Chen, Hsin-Chu (TW); Norio Sugiura, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 0 days.

(21) Appl. No.: 12/878,493

(22) Filed: Sep. 9, 2010

(65) Prior Publication Data
US 2011/0032470 A1 Feb. 10, 2011

Related U.S. Application Data

(63) Continuation-in-part of application No. 12/078,596, filed on Apr. 2, 2008, now abandoned.

(30) Foreign Application Priority Data

Jan. 24, 2008 (TW) ................................ 97102720 A

(51) Int. Cl.
*G02F 1/1341* (2006.01)
*G02F 1/1337* (2006.01)
*G02F 1/13* (2006.01)

(52) U.S. Cl. .......................... 349/189; 349/191; 349/187
(58) Field of Classification Search .................. None
See application file for complete search history.

(56) References Cited

U.S. PATENT DOCUMENTS

| | | | |
|---|---|---|---|
| 2004/0110317 A1* | 6/2004 | Choo et al. | 438/30 |
| 2004/0160566 A1 | 8/2004 | Kawabe et al. | |
| 2004/0233352 A1 | 11/2004 | Chen | |
| 2005/0200800 A1* | 9/2005 | Makimoto et al. | 349/187 |
| 2006/0061727 A1 | 3/2006 | Otani | |

* cited by examiner

*Primary Examiner* — Wen-Ying P Chen
*(74) Attorney, Agent, or Firm* — Thomas|Kayden

(57) ABSTRACT

A method for manufacturing a liquid crystal display panel is provided. The method includes: providing a first substrate and a second substrate; providing a plurality of liquid crystal drops on the first substrate, wherein two adjacent liquid crystal drops in X direction is kept by a distance d1 mm, and two adjacent liquid crystal drops in Y direction is kept by a distance d2 mm, each liquid crystal drop is G mg, d1 16.7, d2 15.4, and G 1; connecting the first substrate and the second substrate so that the liquid crystal drops are sealed between the first substrate and the second substrate; and polymerizing the polymeric components of the liquid crystal drops while applying a predetermined voltage to the liquid crystal drops.

18 Claims, 10 Drawing Sheets

METHOD FOR MANUFACTURING LIQUID CRYSTAL DISPLAY PANEL

This is a continuation-in-part application of application Ser. No. 12/078,596, filed on Apr. 2, 2008 and entitled "LIQUID CRYSTAL DISPLAY PANEL AND METHOD FOR MANUFACTURING THE SAME". This application claims the benefit of Taiwan Patent Application Serial No. 97102720, filed Jan. 24, 2008, the subject matter of which is incorporated herein by reference.

BACKGROUND OF THE INVENTION

1. Field of the Invention

The present invention generally relates to a method for manufacturing a liquid crystal display panel, and especially relates to a method for providing liquid crystal by one drop fill process (ODF).

2. Description of Related Art

Liquid crystal displays are commonly used because of thin, short and low radiation. Conventional liquid crystal display includes two substrates and a liquid crystal layer disposed therebetween. A sealant is located between the substrates for combining the two substrates and sealing the liquid crystal layer. The two substrates are active array substrate and color filter substrate, respectively.

In the present, methods for providing liquid crystal layer include injection and one drop fill process (ODF), etc. Unlike injection, ODF takes less time, creates stable liquid crystal display performance and has high through put, etc.

Conducting ODF to complete liquid crystal providing process includes:

First, providing an active array substrate, cleaning the active array substrate, and coating and curing polyimide on the active array substrate to form an alignment layer thereon. An opposite substrate having the alignment layer may be formed by the above steps.

Then, forming a sealant on the boundary of the opposite substrate. Providing liquid crystal on the active array substrate by a liquid crystal provider. Liquid crystal patterns 101 in lattice and distributing by a pre-determined distance are formed on the active array substrate 100 by repeating to control the moving distance and timing of providing the liquid crystal of the liquid crystal provider. As shown in FIG. 1, FIG. 1 is a conventional active array substrate 100 having a plurality of liquid crystal patterns 101 in lattice and distributing by a pre-determined distance.

Thereafter, facing the active array substrate 100 and the opposite substrate to each other in a vacuum chamber, and aligning and combining the active array substrate 100 and the opposite substrate by sealant, thereby the liquid crystal moves and extends between the active array substrate 100 and the opposite substrate. The liquid crystal layer is sealed.

Conventional ODF is disclosed in United States Patent publication No. 20060061727, which is cooperated herein for reference.

However, while applying ODF, some problems occur: bad uniformity of moving or expending of the liquid crystal between the two substrates, unexpected bumps between the liquid crystal drops, undesired uniformity or density of impurities in liquid crystal, or bad contrast or mura as driving the liquid crystal display, etc.

Therefore, how to solve the above problems is important when applying ODF.

SUMMARY OF THE INVENTION

Accordingly, the present invention is directed to a method for manufacturing a liquid crystal display panel for improving bad contrast and mura by adjusting the distances between liquid crystal drops and weight thereof when applying ODF.

The present invention is also directed to a liquid crystal display panel having uniform brightness and less mura.

An objective of the present invention is to improve brightness and mura by adjusting the distances between adjacent liquid crystal drops and weight thereof.

An objective of the present invention is to improve brightness and mura by adjusting the distances between adjacent liquid crystal drop patterns and weight thereof.

In accordance with the above objectives and other objectives, the present invention provides a method for manufacturing a liquid crystal display panel.

In accordance with the above objectives and other objectives, the present invention provides a liquid crystal display panel.

In an embodiment of the present invention, the method includes providing a first substrate and a second substrate; providing a plurality of liquid crystal drops on the first substrate, each of the liquid crystal drops includes at least one polymeric component and distances between two adjacent liquid crystal drops in X-direction and in Y-direction being d1 mm and d2 mm, respectively, and weight of each liquid crystal drop is G mg, where d1 16.7, d2 15.4 and G 1; combining the first substrate and the second substrate; and polymerizing the polymeric components of the liquid crystal drops while applying a predetermined voltage to the liquid crystal drops.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
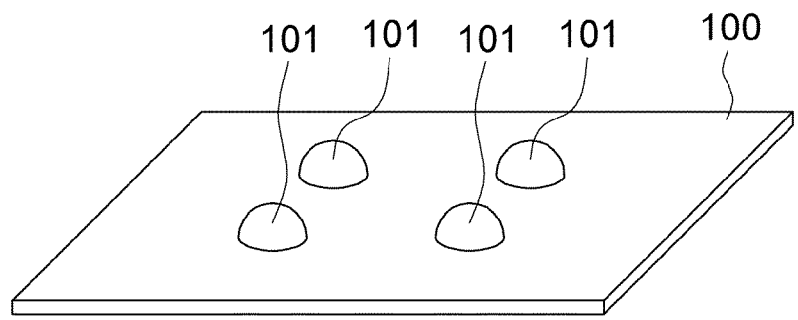
FIG. 1 is a conventional active array substrate having a plurality of liquid crystal patterns in lattice and distributing by a pre-determined distance.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
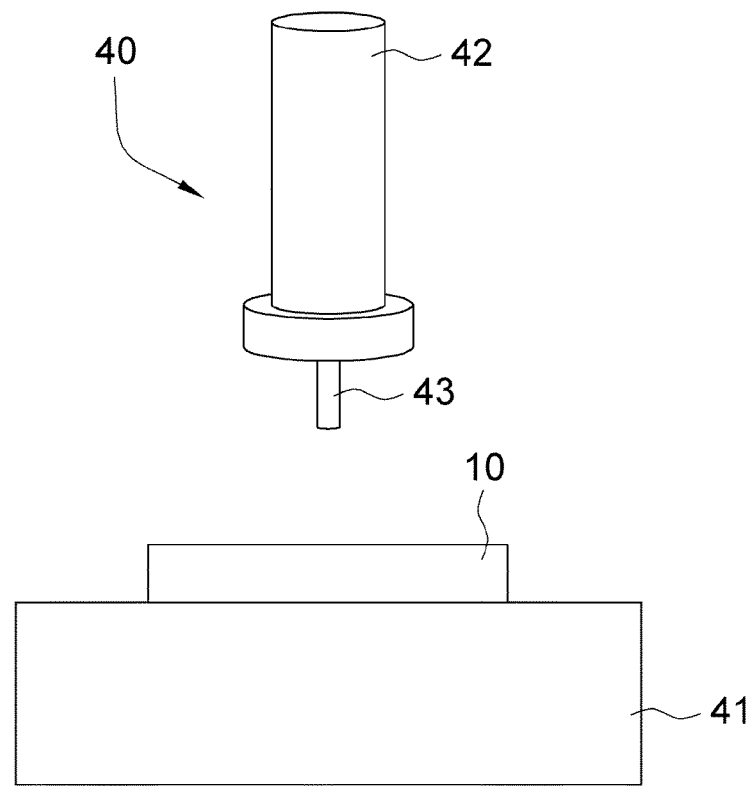
FIGS. 2A to 4 are prospective views showing one drop fill process (ODF) according to embodiments of the present invention.
Figure 2B:
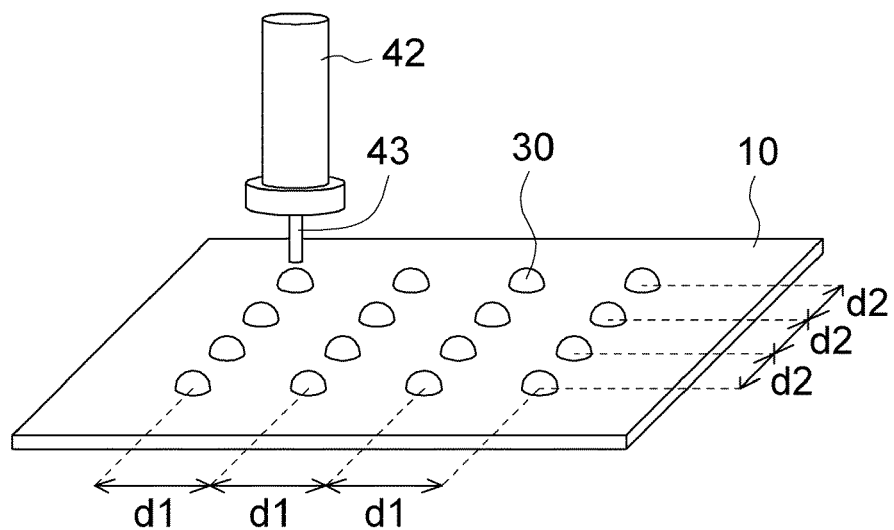
Figure 12A:
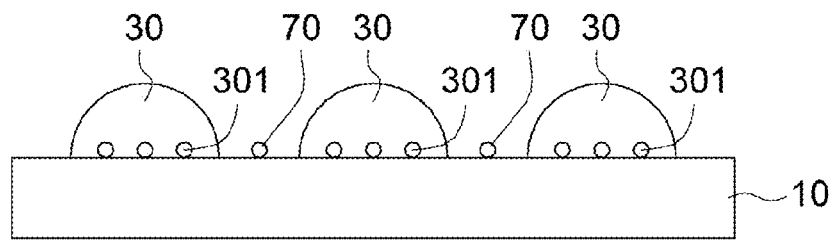
FIG. 12A is a prospective view showing the substrate while conducting ODF process according to one of the embodiments of the present invention.

FIGS. 2A to 4 are prospective views showing one drop fill process (ODF) according to an embodiment of the present invention. As shown in FIG. 2A, liquid crystal provider 40 includes splitter 42 and nozzle 43 connected with the splitter 42. The splitter 42 can store or temporarily contain the liquid crystal. Liquid crystal drops are provided from the nozzle 43. First substrate 1 is disposed on the plate 41. The first substrate 1 is active array substrate, color filter on array substrate or color filter substrate, for example. As shown in FIG. 2B, an ODF is conducted. Provide first substrate 10 and disposed single liquid crystal provider 40 which has single splitter 42 and single nozzle 43 above the first substrate 10. By liquid crystal provider 40, nozzle 43 directs to the desired location on the first substrate 10. Provide liquid crystal drops 30 on the first substrate 10 by fixedly driving the liquid crystal provider 40 or moving forward or backward the liquid crystal provider 40 in S or U direction. As shown in FIG. 12A, each of the liquid crystal drops 30 includes at least one polymeric component 301. Distances d1 mm between two adjacent liquid crystal drops 30 in X-direction are, for example, smaller than or equal to 16.7 mm, preferably smaller than or equal to 16.1 mm. Distances d2 mm between two adjacent liquid crystal drops 30 in Y-direction are, for example, smaller than or equal to 15.4 mm, preferably smaller than or equal to 13.8 mm, and for example, distances d2 mm is smaller than 10 mm. Weight G mg of each of the liquid crystal drops 30 is smaller than or equal to 1 mg, for example, preferably, smaller than or equal to 0.93 mg.

Figure 2C:
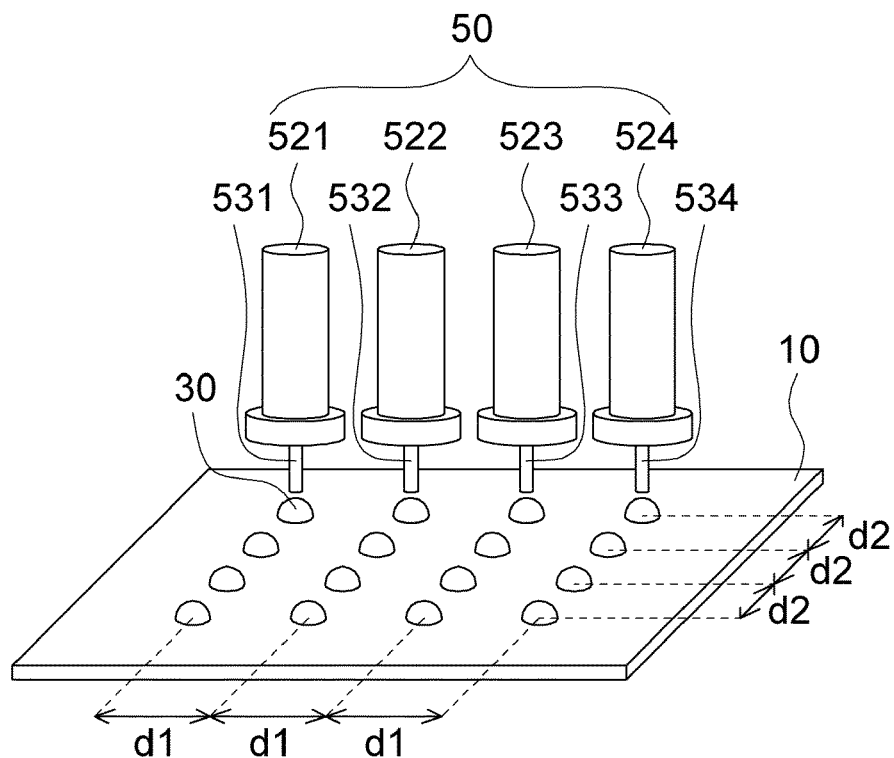

FIG. 2C is a prospective view of ODF of another embodiment of the present invention. Unlike FIG. 2B, liquid crystal provider 50 includes four splitters 521, 522, 523 and 524, and corresponding nozzles 531, 532, 533 and 534. Liquid crystal provider 50 is provided above the first substrate 10, and the nozzles 531, 532, 533 and 534 direct to desired locations of the first substrate 10. Simultaneously or sequentially provide liquid crystal drops 30 on the first substrate 10 by fixedly driving the liquid crystal provider 50 or moving forward or backward the liquid crystal provider 50 in S or U direction. In the present embodiment, number of splitters or nozzles is not limited, while the number is 2, 3 or more than 4 may be used depending on process tolerance or design rules. Distances d1 mm between two adjacent liquid crystal drops 30 in X-direction are, for example, smaller than or equal to 16.7 mm, preferably smaller than or equal to 16.1 mm. Distances d2 mm between two adjacent liquid crystal drops 30 in Y-direction are, for example, smaller than or equal to 15.4 mm, preferably smaller than or equal to 13.8 mm. Weight G mg of each of the liquid crystal drops 30 is smaller than or equal to 1 mg, for example, preferably, smaller than or equal to 0.93 mg.

Figure 3A:
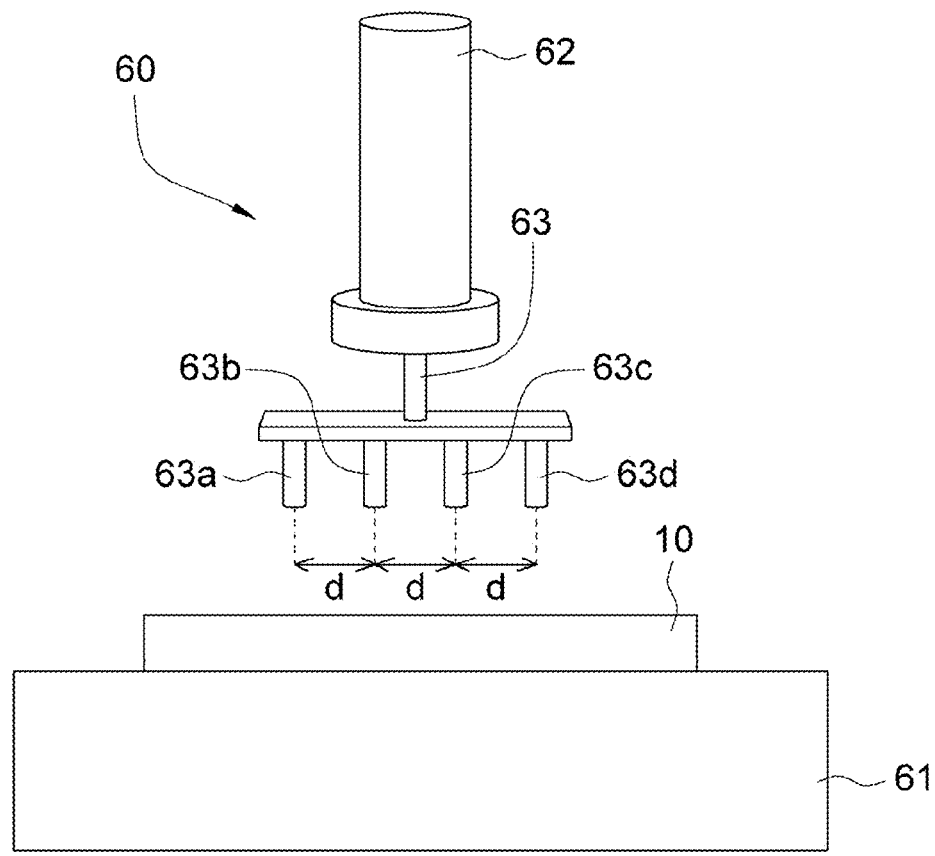
Figure 3B:
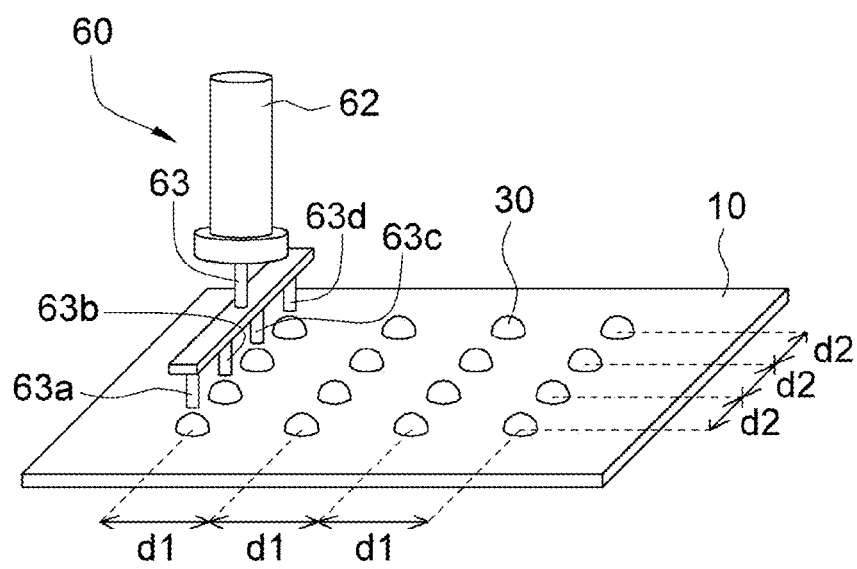

FIGS. 3A to 3B are prospective views of ODF of still another embodiment of the present invention. Unlike FIG. 2B, liquid crystal provider 60 includes single splitter 62, single nozzle 63, and four sub-nozzles 63a, 63b, 63c and 63d connected with the nozzle 63. In the present embodiment, number of splitters or nozzles is not limited, while the number is used depending on process tolerance or design rules. First substrate 10 is disposed on the plate 61. As shown in FIG. 3B, liquid crystal provider 60 disposed above the first substrate 10, and sub-nozzles 63a, 63b, 63c and 63d direct to desired locations of the first substrate 10. Simultaneously or sequentially provide liquid crystal drops 30 on the first substrate 10 by fixedly driving the liquid crystal provider 60 or moving forward or backward the liquid crystal provider 60 in S or U direction. In the present embodiment, number of splitters or nozzles is not limited, while the number is 2, 3 or more than 4 may be used depending on process tolerance or design rules. Distances d1 mm between two adjacent liquid crystal drops 30 in X-direction are, for example, smaller than or equal to 16.7 mm, preferably smaller than or equal to 16.1 mm. Distances d2 mm between two adjacent liquid crystal drops 30 in Y-direction are, for example, smaller than or equal to 15.4 mm, preferably smaller than or equal to 13.8 mm. Weight G mg of each of the liquid crystal drops 30 is smaller than or equal to 1 mg, for example, preferably, smaller than or equal to 0.93 mg.

Figure 4:
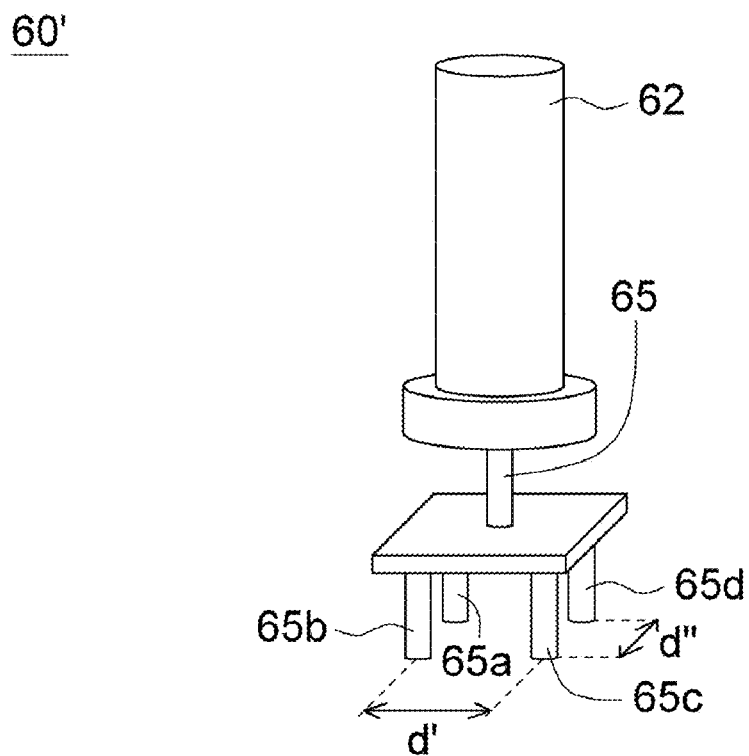

FIG. 4 is a liquid crystal provider 60' for ODF of a further embodiment of the present invention. Liquid crystal provider 60' includes a single splitter 62, nozzle 65 and four sub-nozzles 65a, 65b, 65c and 65d. Referring both of FIGS. 3A and 4, sub-nozzles 65a, 65b, 65c and 65d of liquid crystal provider 60 are arranged in a line. Distance d of adjacent sub-nozzles 65a, 65b, 65c and 65d corresponds to distance d1 or d2 of two adjacent liquid crystal drops 30. However, distances d, d1 and d2 can be changes because of process tolerance or design rules. Sub-nozzles 65a, 65b, 65c and 65d of liquid crystal provider 60' are arranged in array. As shown in FIG. 4, sub-nozzles 65a, 65b, 65c and 65d are arranged in matrix. In the present embodiment, distance d' between sub-nozzles 65a and 65d is equal to distance d1 between two adjacent liquid crystal drops 30, and distance d" between sub-nozzles 65a and 65b is equal to distance d2 between two adjacent liquid crystal drops 30. However, if distance d' between sub-nozzles 65a and 65d is equal to distance d2 between two adjacent liquid crystal drops 30, distance d" between sub-nozzles 65a and 65b is equal to distance d1 between two adjacent liquid crystal drops 30. Steps of providing liquid crystal drops 30 on the first substrate 10 can be referred to previous embodiments.

Figure 5:
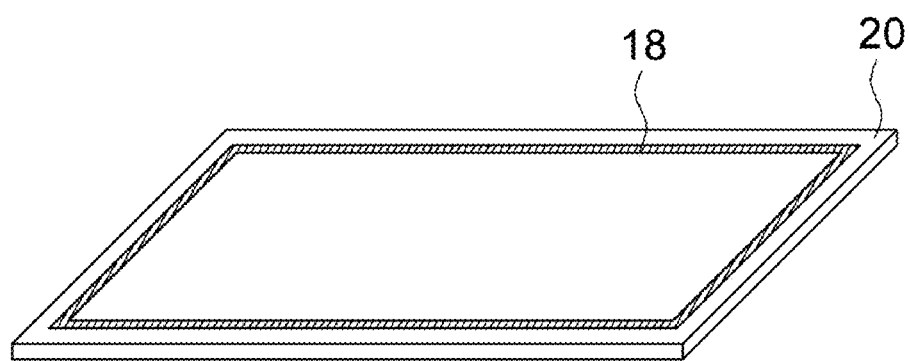
FIG. 5 is a substrate having a sealant formed on a boundary thereof according to one of the embodiments of the present invention.

Then, as shown in FIG. 5, providing second substrate 20 and providing a sealant 18 on a boundary of the second substrate 20. However, the sealant 18 can be applied on the first substrate 10 but the second substrate 20. FIG. 5 is second substrate 20 having sealant 18 of the present embodiment. First substrate 10 is an active array substrate and the second substrate 20 is a color filter substrate, for example. First substrate 10 is a color filter on array (COA) substrate and the second substrate 20 is a common electrode substrate, for example. First substrate 10 is a common electrode substrate and the second substrate 20 is a color filter on array substrate, for example. Active array substrate mentioned above may be thin film transistor array substrate.

After the steps above, combining the first substrate and the second substrate according to the embodiment of the present invention as shown in FIGS. 6 to 10 which are prospective views.

Figure 6:
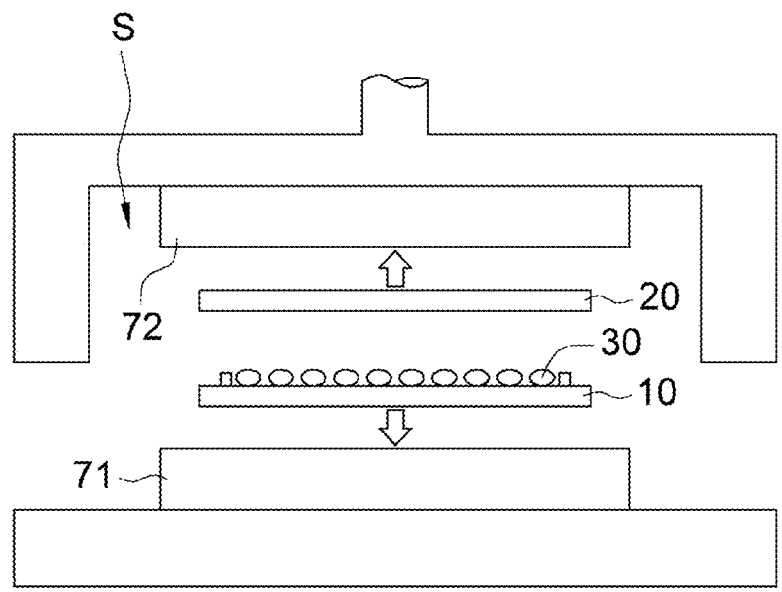
FIGS. 6 to 10 are prospective views showing process of combining substrates according to one of the embodiments of the present invention.

As show in FIG. 6, first substrate 10 is set or install on the plate 71 of the combining device 7, while second substrate 20 is set or install on the plate 72 of the combining device 7. Liquid crystal drops 30 are on the first substrate 10. Step of extracting to form vacuum in space S is ready when first substrate 10 and second substrate 20 are respectively set on the plates 71 and 72.

Figure 7:
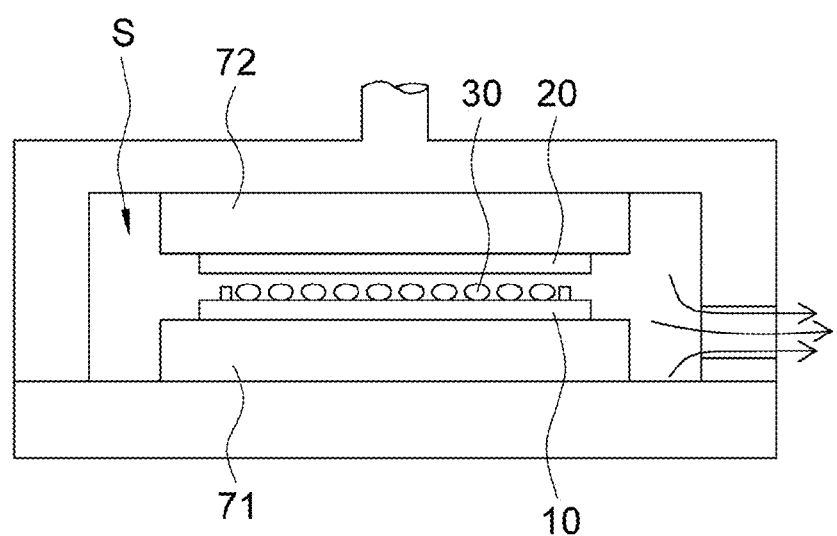

As shown in FIG. 7, dispose first substrate 10 and second substrate 20 in the combining device 7, and extracting to form vacuum in space S. Align first substrate 10 and second substrate 20 by marks of first substrate 10 and/or second substrate 20 and camera or Charge Coupled Device.

Figure 8:
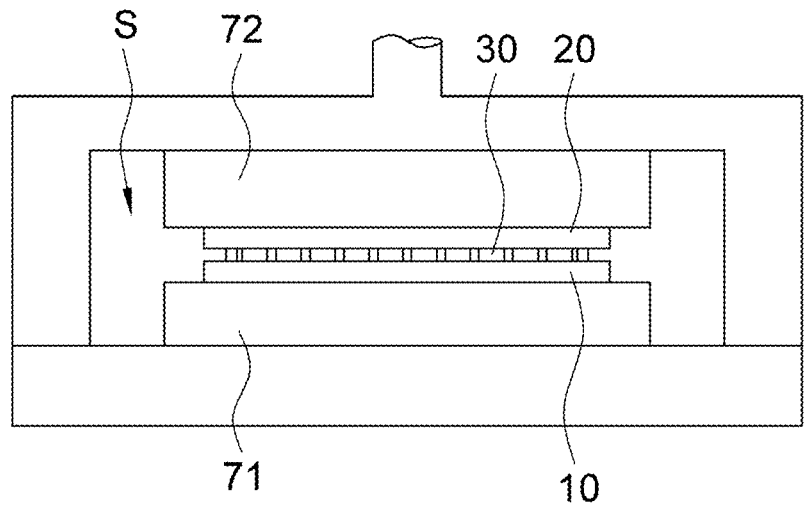
Figure 9:
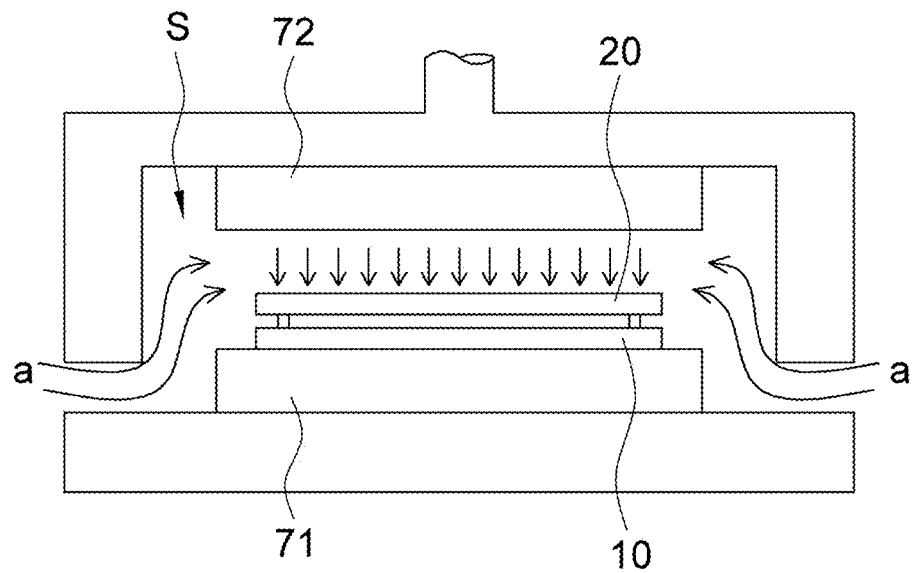
Figure 10:
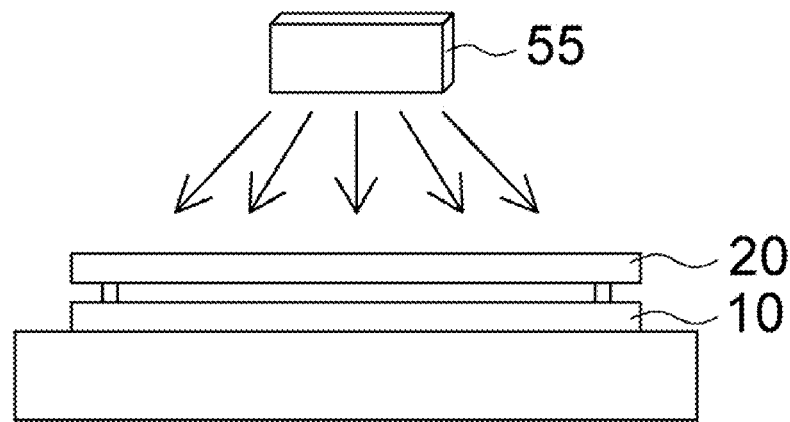

Space S is a vacuum in FIG. 8. Approach first substrate 10 and second substrate 20 with each other and pre-combine first substrate 10 and second substrate 20 by sealant 18, therefore, liquid crystal drops 30 move and extend in the gap between first substrate 10 and second substrate 20 and sealed there between.

Set apart first substrate 10 and plate 71. As show in FIG. 9, pass air a in space S to perform vacuum break to make space S have atmosphere. Under atmosphere pressure, second substrate 20 is pressed to the first substrate 10, so a liquid crystal layer is formed between first substrate 10 and second substrate 20.

Then, cure sealant 18 between first substrate 10 and second substrate 20 by curing device 55 to compactly combine first substrate 10 and second substrate 20. For example, if the sealant 18 is heat-sensitive, the energy provided from the curing device 55 to the sealant 18 is heat.

Figure 11:
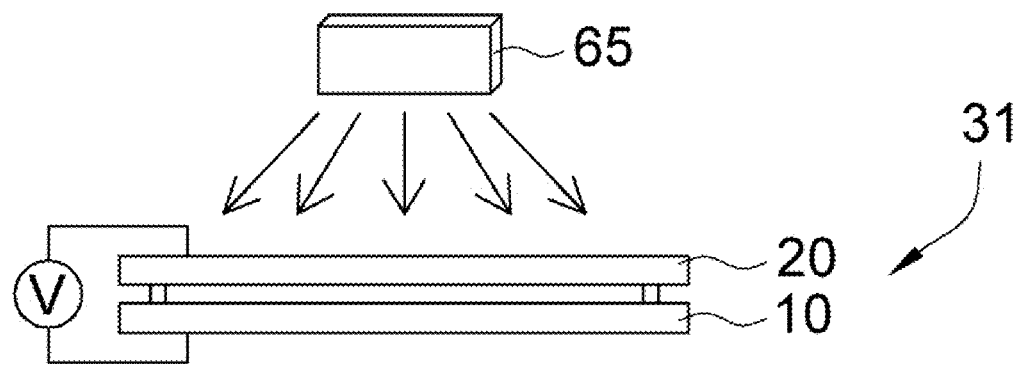
FIG. 11 is prospective views showing process of polymerizing the polymeric components according to one of the embodiments of the present invention.

Thereafter, as shown in FIG. 11, a polymer sustained alignment (PSA) technology is used. FIG. 11 is prospective views of step of polymerizing the polymeric components according to the embodiment of the present invention.

As shown in FIG. 11, a drive voltage V is applied between electrodes of the first substrate 10 and electrodes of the second substrate 20, and irradiation of ultraviolet light by using UV generating device 65 is conducted to the liquid crystal drops 30. The electrodes of the first substrate 10 are pixel electrodes or common electrodes, and the electrodes of the second substrate 20 are another. With this, it becomes possible to obtain a desired pre-tilt in the liquid crystal molecules. Liquid crystal display panel 31 is manufactured after that.

Figure 12B:
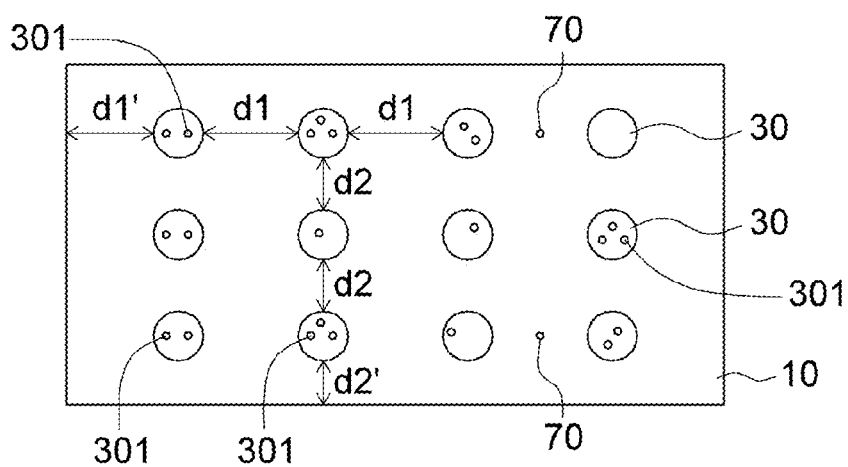
FIG. 12B is a top view showing the substrate while conducting ODF process according to one of the embodiments of the present invention.

FIGS. 12A and 12B are side view and top view of the first substrate 10, respectively, when conducting ODF.

Generally, liquid crystal drops 30 and impurities 70 are on the first substrate 10. Each of the liquid crystal drops 30 includes at least one polymeric component 301. Impurities 70 include organic materials, inorganic materials, particles or fibers, etc., for example. It's difficult to prevent occurrence of impurities 70, but if concentration, density, distribution or materials of the impurities 70 is kept under process or specification tolerance, qualified piqued crystal display panel can be manufacturing successfully.

Mixed impurities 70 and liquid crystal drops 30 having the polymeric components 301 are on the first substrate 10 as shown in FIG. 12B. Distance d1 mm between two adjacent liquid crystal drops in X-direction is smaller than or equal to 16.7 mm, preferably smaller than or equal to 16.1 mm. Distance d2 mm between two adjacent liquid crystal drops in Y-direction is smaller than or equal to 15.4 mm, preferably smaller than or equal to 13.8 mm, and for example, distances d2 mm is smaller than 10 mm. Weight G mg of each of the liquid crystal drops 30 is smaller than or equal to 1 mg, for example, preferably, smaller than or equal to 0.93 mg. Distances d1' and d2' between liquid crystal drops 30 which earnestly adjacent to the edges of the first substrate 10 and the edges of the first substrate 10 are 37 mm, respectively, as for 46 inch liquid crystal display panel.

Figure 13:
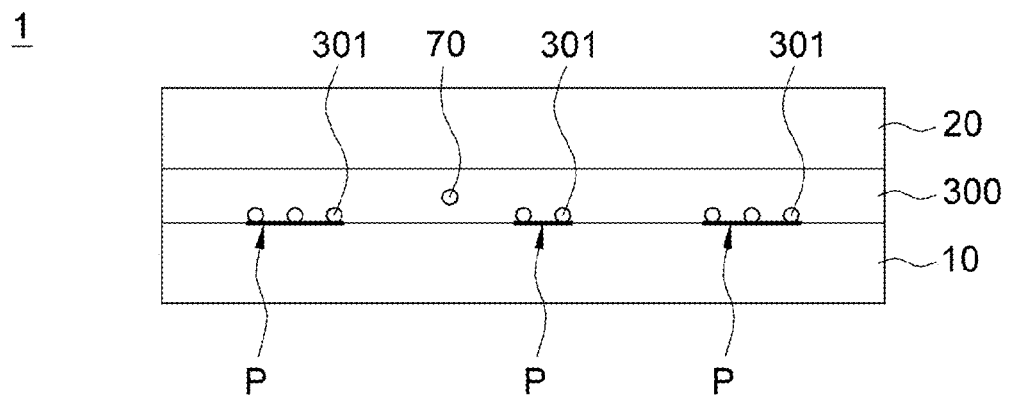
FIG. 13 is a liquid crystal display panel according to one of the embodiments of the present invention.

FIG. 13 is liquid crystal display panel according to the embodiment of the present invention. Liquid crystal display panel 1 comprises first substrate 10, second substrate 20 and liquid crystal layer 300 disposed therebetween. Few impurities 70 and liquid crystal drops 30 which is shown during manufacturing form liquid crystal drop patterns P on the first substrate 10. Distance d1 mm between two adjacent liquid crystal drop patterns P in X-direction is smaller than or equal to 16.7 mm, preferably smaller than or equal to 16.1 mm. Distance d2 mm between two adjacent liquid crystal drop patterns P in Y-direction is smaller than or equal to 15.4 mm, preferably smaller than or equal to 13.8 mm. Therefore, $d1 \leq 16.7$ and $d2 \leq 15.4$, and preferably, $d1 \leq 16.1$ and $d2 \leq 13.8$.

Figure 14:
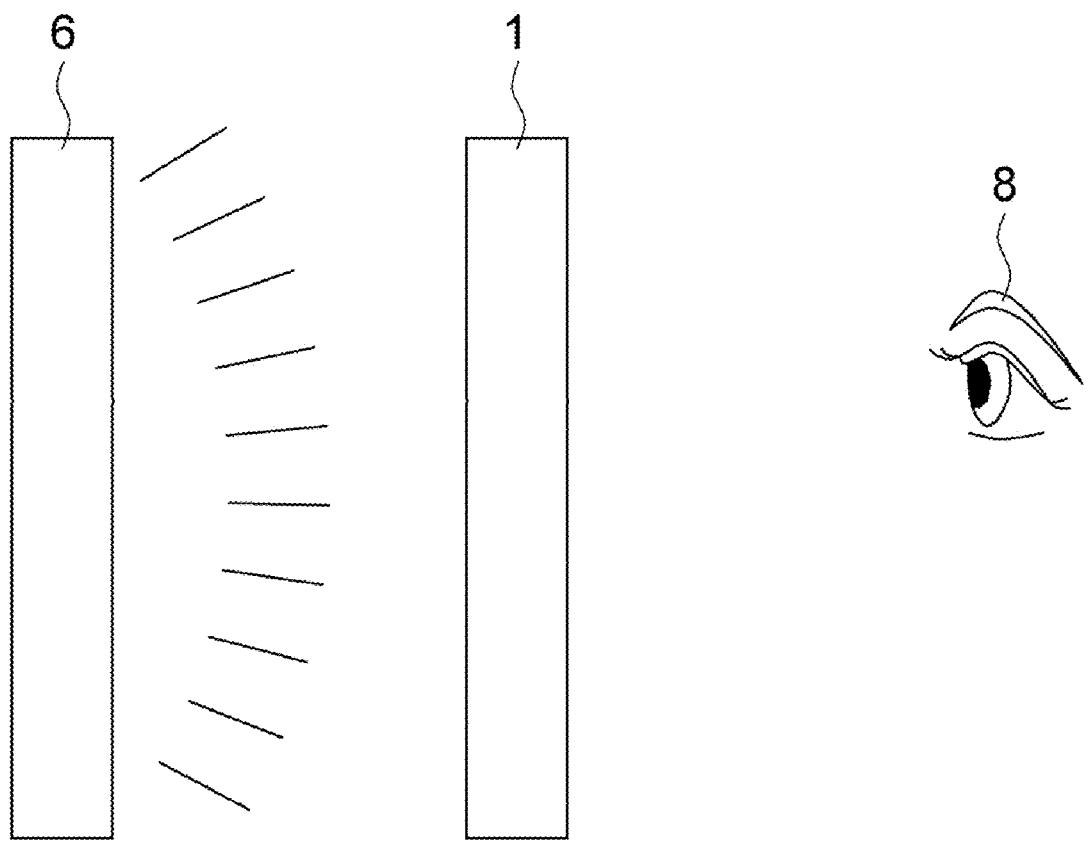
FIG. 14 is a prospective view showing the way to observe the liquid crystal drop patterns of the liquid crystal display panel according to the experiment of the present invention by a backlight.
Figure 15:
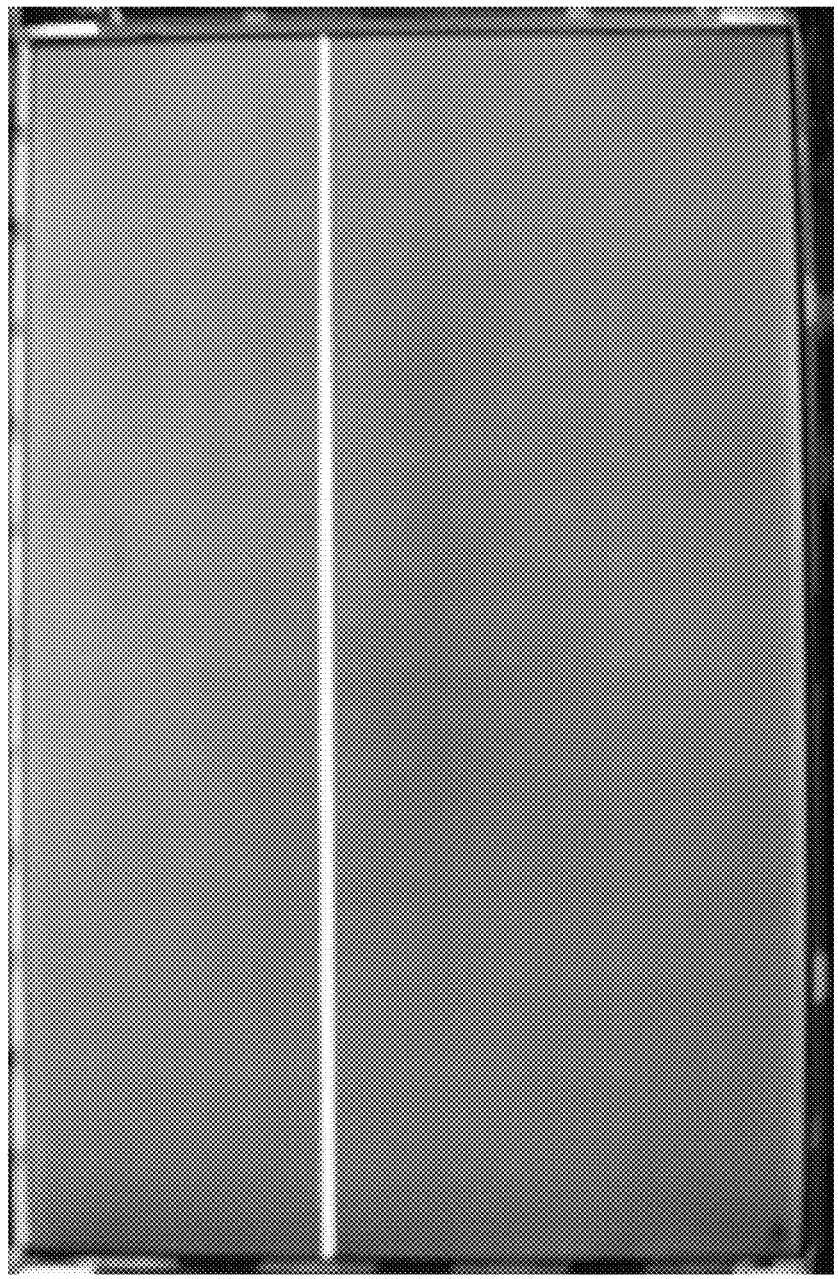
FIG. 15 is a photo of the liquid crystal display panel of FIG. 13 captured by the system of FIG. 14.

FIG. 14 is a system for observing liquid crystal drop patterns of liquid crystal display panel by backlight. Liquid crystal drop patterns P can be observed by human eyes 8 while backlight 6 provides sufficient light to liquid crystal display panel 1. Backlight 6 is cold cathode fluorescent lamp, external cathode fluorescent lamp, or mercury lamp, for example. FIG. 15 is photo of the liquid crystal display panel of FIG. 13 captured by the system of FIG. 14. Liquid crystal drop patterns P are arranged in matrix, and liquid crystal drop patterns P are dot-like. By picture modify device or software to adjust contrast of the photo to make it more clear and easy to find that the liquid crystal drop patterns P are distributed in matrix with white (or black) dots.

Table 1 shows mura judgment, which is observed by system of FIG. 13, of samples 1, 2 and control of the present experiments. Experiments are taken 46 inch liquid crystal display panel having 2232 mg liquid crystal layer for example.

Table 1 includes numbers of liquid crystal drop patterns in Y-direction * numbers of liquid crystal drop patterns in X-direction (distance between adjacent liquid crystal drop patterns in Y-direction, distance between adjacent liquid crystal drop patterns in X-direction; d2, d1), weight (G) per liquid crystal drop, and judgments of mura including block mura, lattice mura and drop mura. The larger the judgment is, the worse the mura problem is.

TABLE 1

|  | numbers of liquid crystal drop patterns in Y-direction * numbers of liquid crystal drop patterns in X-direction | mura judgment | | |
|---|---|---|---|---|
|  | (d2, d1), G (weight per liquid crystal drop) | block mura | lattice mura | drop mura |
| sample 1 | 40*60 (13.8 mm, 16.7 mm), 0.93 mg/drop | 3.3 | 2.2 | 2.4 |
| sample2 | 36*62 (15.4 mm, 16.1 mm), 1 mg/drop | 3.8 | 2.4 | 2.4 |
| control | 24*50 (23.5 mm, 20.1 mm), 1.86 mg/drop | >4 | Very bad | Very bad |

As known in Table 1, the larger G is, the more serious the mura problem is. While G is reducing, mura judgments are reducing as well. Therefore, the mura problem is improved.

Compared with sample 1 and control, d1 and d2 of sample 1 are significantly smaller than that of control. G of sample 1 is smaller than that of control. For three mura problems, sample 1 is better than control.

Compared with sample 2 and control, d1 and d2 of sample 1 are significantly smaller than that of control. G of sample 2 is smaller than that of control. For three mura problems, sample 2 is better than control.

Compared with sample 1 and sample 2, because sample 1 has smaller G and d2, for three mura problems, sample 1 is better than sample 2.

Therefore, mura problems can be improved by adjust distances between adjacent liquid crystal drops, numbers thereof in X-direction or Y-direction, weight thereof, volume thereof (depending on the density if the liquid crystal), or distribution thereof etc.

In summary, the liquid crystal display panel and the manufacturing method thereof provided by the present invention have at least following advantages:
1. For ODF, distances between adjacent liquid crystal drops, weight and/or numbers thereof in X-direction or Y-direction are arranged properly, process problem or mura issue can be reduced.
2. Bright uniformity of the liquid crystal display panel can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a liquid crystal display panel, comprising:
   providing a first substrate and a second substrate, the first substrate having an edge;
   providing a plurality of liquid crystal drops on the first substrate, each of the liquid crystal drops comprising at least one polymeric component and distances between two adjacent liquid crystal drops in X-direction and in Y-direction being $d1$ mm and $d2$ mm, respectively, a distance between an edge of the first substrate and one of the liquid crystal drops earnestly adjacent to the edge of the first substrate being 37 mm, and weight of each liquid crystal drop is $G$ mg, where $d1 \leq 16.7$, $d2 \leq 15.4$ and $G \leq 1$;
   combining the first substrate and the second substrate; and
   polymerizing the polymeric components of the liquid crystal drops while applying a predetermined voltage to the liquid crystal drops.

2. The method according to claim 1, wherein the step of polymerizing the polymeric components of the liquid crystal drops is performed by irradiating the polymeric components with ultraviolet light.

3. The method according to claim 1, wherein $d1 \leq 16.1$.

4. The method according to claim 3, wherein $d2 \leq 13.8$.

5. The method according to claim 3, wherein $G \leq 0.93$.

6. The method according to claim 1, wherein $d2 \leq 13.8$.

7. The method according to claim 6, wherein $G \leq 0.93$.

8. The method according to claim 1, wherein $G \leq 0.93$.

9. The method according to claim 1, further comprising providing a sealant substantially on a boundary of the second substrate.

10. The method according to claim 9, further comprising curing the sealant.

11. The method according to claim 1, wherein the first substrate is an active array substrate and the second substrate is a color filter substrate.

12. The method according to claim 1, wherein the first substrate is a color filter on array substrate.

13. A method for manufacturing a liquid crystal display panel, comprising:
   providing a first substrate and a second substrate;
   providing a plurality of liquid crystal drops on the first substrate, distances between two adjacent liquid crystal drops in X-direction and in Y-direction being $d1$ mm and $d2$ mm, respectively, and weight of each liquid crystal drop is $G$ mg, where $d1 \leq 16.7$, $d2 < 10$ and $G < 1$;
   providing a sealant substantially on a boundary of the second substrate; and combining the first substrate and the second substrate.

14. The method according to claim 13, wherein $d1 \leq 16.1$.

15. The method according to claim 14, wherein $G \leq 0.93$.

16. The method according to claim 13, further comprising curing the sealant.

17. The method according to claim 13, wherein the first substrate is an active array substrate and the second substrate is a color filter substrate.

18. The method according to claim 13, wherein the first substrate is a color filter on array substrate.

* * * * *